United States Patent

Prevost et al.

[11] Patent Number: 5,232,609
[45] Date of Patent: Aug. 3, 1993

[54] SELF-SUPPORTING ELEMENT USED DURING THE FERMENTATION AND BAKING OF BREAD MAKING PRODUCTS

[75] Inventors: Didier Prevost, Abbeville; Gonzague Prouvost, La Madeleine; Raymond Badinier, Viry-Chatillon; Albert Stubbe, late of Tourcoing, all of France, by Joëlle D. Flipo, Grégoire A. C. Stubbe, Ariane B. Six, legal representatives

[73] Assignee: ETS Guy DeMarle, Pont-Remy, France

[21] Appl. No.: 905,510

[22] Filed: Jun. 26, 1992

Related U.S. Application Data

[63] Continuation of Ser. No. 524,693, May 17, 1990, abandoned, which is a continuation of Ser. No. 16,573, Feb. 19, 1987, abandoned.

[30] Foreign Application Priority Data

Feb. 21, 1986 [FR] France .................. 86 02471

[51] Int. Cl.$^5$ .................................................. B28B 7/34
[52] U.S. Cl. ........................................ 249/102; 99/426; 99/441; 99/448; 99/450; 99/DIG. 15; 249/113; 249/115; 249/120; 249/134; 249/139
[58] Field of Search ............... 249/102, 113, 114.1, 249/115, 134, 135, 139, 140, 120, 126, DIG. 2; 99/426, 441, 448, 450, DIG. 15

[56] References Cited

U.S. PATENT DOCUMENTS

| | | |
|---|---|---|
| 534,632 | 2/1895 | Coleman .................. 249/127 |
| 780,253 | 1/1905 | Yere ........................ 249/113 |
| 1,263,103 | 4/1918 | Pfeil ......................... 99/450 |
| 1,402,065 | 1/1922 | Griffin ..................... 249/113 |
| 1,516,232 | 11/1924 | Kratzer .................... 249/120 |
| 1,671,450 | 5/1928 | Ross ......................... 99/450 |
| 1,979,924 | 11/1934 | Young ...................... 249/113 |
| 2,002,838 | 5/1935 | Soderholm ................ 99/426 |
| 2,116,490 | 5/1938 | Katzinger ................. 220/23.6 |
| 2,640,445 | 6/1953 | Reget ....................... 425/439 |
| 3,229,886 | 1/1966 | Grogel ................... 229/3.5 MF |
| 3,490,391 | 1/1970 | Vogt ........................ 249/113 |
| 4,009,859 | 3/1977 | Bangert ................... 249/122 |
| 4,356,995 | 11/1982 | Lohner .................... 249/134 |

FOREIGN PATENT DOCUMENTS

| | | | |
|---|---|---|---|
| 645551 | 3/1964 | Belgium ................... 99/426 |
| 0045945 | 2/1982 | European Pat. Off. . | |
| 2097608 | 7/1970 | France ..................... 249/134 |
| 2215017 | 8/1974 | France ..................... 99/450 |
| 2423983 | 12/1979 | France ..................... 99/450 |
| 2446070 | 8/1980 | France . | |
| 2480081 | 10/1981 | France . | |
| 2559030 | 8/1985 | France ..................... 249/113 |
| 372566 | 5/1932 | United Kingdom ........ 99/450 |
| 2154860A | 9/1985 | United Kingdom . | |

OTHER PUBLICATIONS

*Plastics*, J. DuBois and F. John, p. 31, N.Y. (1967).
English, Lawrence, "Fabricating the Future with Composite Materials", *ME*, Jan. 1987, pp. 37–41.
Anchor Hocking, "Microware" advertisement, *Retailing Home Furnishings*, Nov. 14, 1977, p. 37.
Advertisement for Demarle Multibake Bakeware, Feb. 1990.

*Primary Examiner*—Jay H. Woo
*Assistant Examiner*—Robert B. Davis
*Attorney, Agent, or Firm*—Cushman, Darby & Cushman

[57] ABSTRACT

General purpose equipment is provided for supporting bread making products or similar during the process of fermentation and baking of the dough, including as basic unit elements: a tray with side flanges (1), one or more replaceable and interchangeable non stick membranes or molds, perforated, or not, each preformed to the dimensions and shapes of a bread, Viennese bread or pastry piece or pieces to be baked, each of these interchangeable membranes or molds resting, on the tray without being fixed or at least while remaining removable.

37 Claims, 4 Drawing Sheets

SELF-SUPPORTING ELEMENT USED DURING THE FERMENTATION AND BAKING OF BREAD MAKING PRODUCTS

This is a continuation of application Ser. No. 07/524,693, filed on May 17, 1990, which was abandoned upon the filing hereof which is a continuation of Ser. No. 07/016,573, filed on Feb. 19, 1987 and now abandoned.

BACKGROUND OF THE INVENTION

1. Field of the Invention

The present invention relates to improvements to equipment used during the preparation of bread making products or similar, for supporting the lumps of dough during the steps of fermentation and baking of the dough, and the invention relates more precisely to general purpose equipment, as well as a tray and molds or membranes for supporting the lumps of dough during these steps.

2. Description of the Related Art

The traditional way of making bread or similar bread making products includes two essential steps: fermentation and baking, which presupposes a priori intermediate handling and storage operations. In the oldest methods, the shaped lumps of dough are first of all deposited for fermentation of linen cloths which are called "napkins". They are then taken up manually one by one to be placed directly on the floor of the oven, either using an oven peel, or an oven loading conveyer.

Such handling operations are delicate, and require qualified staff for the uncooked bread doughs are sticky, soft and plastic.

The appearance of supports receiving the lumps of dough during fermentation and baking, as well as the construction, because of such supports, of ventilated ovens have brought a substantial improvement to these methods. One of the main advantages with respect to the conventional methods is that of doing away with handling.

The lumps of dough are placed just after shaping in metal compartmented supports (woven stainless steel netting or aluminium plates) or flexible supports (textile netting) fixed to a rigid metal frame; the compartments correspond to the shape of the loaves it is desired to produce. The lumps of dough remain in these supports during fermentation and baking.

As for the ventilated oven, the heat required for cooking is no longer supplied through the floor and dome, but by a stream of hot air. Tiered carriages receive the above defined metal or flexible supports and enter successively the fermentation cabinets, then the ventilated oven. Fairly often the carriage is rotated about a vertical axis so that the heat is well distributed (rotary oven). For the smallest sized products, more especially in pastry making, the carriages are replaced by lateral slides fixed to the walls of the ventilated oven.

The supports must allow good baking in this stream of hot air. This is why they are made from open work material such as fine mesh metal grids, thin perforated metal sheets or else an open work glass fabric including at least 50% of void and fixed to a rigid metal frame. In addition, they are specially treated so as to be non-stick, generally by being provided with a silicone elastomer or silicone resin or polytetrafluorethylene TEFLON® based coating.

It should be noted that these supports are flexible and, for handling them, they are always fixed to a rigid frame formed of a metal construction and sometimes with spacers supporting each compartment.

The frame corresponds to the dimensions of these carriages; the spacers are adapted to each type of netting, depending on the number, the arrangement and the form of the compartments.

What is described above is illustrated for example by the patent applications FR 2 097 608 and 2 559 030 in which we find for example the association of a flexible textile net, formed of a silicone coated glass fabric, with a rigid metal frame to which it is fixed and whose shape assigns it to a single use.

This design, as advantageous as it may be, requires for the baker multiple and specialized equipment, designed for each type of product which he desires to make; this requires a considerable and space consuming total number of pieces of equipment which are not permanently used, and which cannot be done without. Furthermore, the non stick coating of these supports must be periodically renewed, or certain equipment must be changed, which requires the retreatment or removal of the whole assembly to specialized plants.

Furthermore, tests have been made for using this equipment in conventional fixed floor ovens. But the baking is not satisfactory on the metal supports, heterogeneous baking with zones of burning equals "scorching" of the bread. It is possible with a flexible support but, in this case, it must be placed practically in contact with the floor of the oven, and rapid wear has been observed due particularly to abrasion phenomenon during handling.

Finally, it will be further noted that the solutions outlined above of the prior art are essentially valid for the different forms of elongate crusty loaves such as the "baguette". The flexible support technique of the suspended net type, such as those described in the patent application FR 2 559 030, do not in any case allow round, square, oval, etc shapes to be baked. These round, square, oval, etc shapes of dough must at present be baked on metal plates, pressed or not, which may be either greased or covered with a non stick coating.

SUMMARY OF THE INVENTION

The object of the invention is to provide new equipment which, by its design, overcomes the above described drawbacks of known equipment and which is adapted readily and less expensively to all bread making or similar products to be baked in the oven.

To this end, new general use equipment in accordance with the invention, usable during the fermentation and baking of bread doughs or similar, is characterized in that it includes as unitary basic elements, a tray with lateral flanges, as well as at least one replaceable and interchangeable membrane or mold, possibly of open work construction, formed from or coated with a material having non stick properties and preshaped in accordance with the dimensions and shapes of a piece or of an assembly of pieces of bread, Viennese bread, pastries or similar to be baked, this membrane or mold being adapted to rest removably on the tray.

This new general purpose equipment overcomes the drawbacks of the present day methods:
  suppression of intermediate handling, in the case of a fixed floor oven or tunnel oven,
  use for all the types of products elaborated by the baker-pastry maker with a minimum space occupied and minimum immobilization time, (loaf, baguette, croissants, choclate buns, buns, milk rolls, hot dogs, ...), use not only in a fixed floor oven but also in a ventilated oven, or even in the tunnel ovens of industrial bakers, retreatment of existing support no longer necessary because the non fixed membrane can be simply replaced.

A tray intended to form part of the construction of the above mentioned equipment has the shape of a rectangular or square container, with flat bottom, preferably perforated, the edges, also preferably perforated, serving for wedging the preformed mold or membrane, preferably, in such a tray. The configuration of the side flanges allows stacking or nesting of the trays; advantageously, this tray is made from metal, preferably from stainless steel or aluminium or else, following another possibility, it is made from a non-dielectric material which may be used in a microwave oven; a removable and dismantlable fixing means may if required be provided on the membranes or molds so as to avoid accidental movement thereof during automatic removal of the loaves from the molds by suction, brushing or combing.

Still to comply with the above mentioned aim, another aspect of the invention relates to a membrane or mold for supporting bread making products or similar during the procedure of fermentation and baking of the dough which is characterized by the fact that it is adapted so as to be able to rest removably on a support having the shape of a tray with side flanges with respect to which it is replaceable and interchangeable and by the fact that it is possibly of open work construction, formed of or coated with a material having antistick properties, and preformed according to the dimensions and shapes of a piece or an assembly of pieces of bread, Viennese bread, or pastry or similar to be baked, and by the fact that it is self supporting, that is to say that it keeps its shape when it rests on its support with side flanges in the shape of a tray, this latter being possibly an independent element or else on the contrary an element of a carriage or a transfer chain.

Such a membrane or mold, intended to form part of the construction of the above mentioned equipment, is adapted so as to be able to rest removably on the support tray, praticularly a tray such as mentioned above, with respect to which it is replaceable and interchangeable; it is possibly of open work construction, formed from or coated with a material having non stick properties, and preformed according to the dimensions and shapes of a piece or assembly of pieces of bread, Viennese bread, pastry or similar to be baked; furthermore, it comprises a woven, knitted or non woven screen formed of glass threads and/or carbon fibers and/or ceramic threads and/or similar materials.

In a first embodiment of such a membrane, the non stick property is obtained by impregnation and/or coating of the strands with one or more elastomers or silicone resins, and it is preformed by molding and stiffening by vulcanization of the elastomers or by baking the silicone resins, with preferably the creation of thicker silicone zones, particularly on the periphery of the membranes, so as to provide stiffening and/or protection of the fragile zones.

In another embodiment of such a membrane, the non stick property is obtained by impregnation and/or coating of the strands with one or more elastomers or silicone resins, it is preshaped by pressing and it is stiffened once pressed, by vulcanization of the elastomers or by making the resins, with preferably the creation of thicker silicone zones, particularly on the periphery of the membranes so as to provide stiffening and/or protection of the fragile zones. In the case of pressing, it is desirable for this to be carried out so that all the threads have the same length while counterbalancing the hollow impressions by bosses disposed in the central zones situated between the hollows, the lateral external rows of bosses being able to be reversed downwardly.

It is thus easy to give the membrane any configuration appropriate to the type of bread making or similar product which it is to support.

In particular, in the case of a membrane obtained by molding as mentioned above, said membrane may have a wavy profile in the form of substantially semicylindrical cups which are more or less wide with a more or less flattened bottom, these cups being possibly separated by gaps materialized by a flat surface situated at the top of the cups ensuring improved circulation of the heat; or else it may be molded so as to obtain a succession of rectangular or square flat bottomed spans, separated by an inverted V shaped fold, and intended to receive pieces of Viennese bread such as croissant, or any other pieces which may be jointingly connected by one or more points of their perimeters.

In particular also, in the case of a membrane obtained by pressing as mentioned above, said membrane may be pressed so as to create longitudinally and transversely successions of hollow impressions, of rectangular or square shape, with a clearance allowing the baked pieces to be removed and separated through narrow passages, so as to receive all rectangular or square section pieces, such as choclate buns, almond slices; or else it may be pressed so as to create oval cradles of oblong shape with a clearance for removing the pieces, these cradles succeeding each other adjacently by the large side, being able to receive shuttle shaped pieces such as milk rolls, butter croissants; or else it may be pressed so as to create successive lines of round and hollow dishes, with flat bottom, of variable diameter, depth and clearance, depending on the nature of the pieces to be baked, such as small round buns, rolls for hamburgers, buns, muffins, fruit loaves; or else finally it may be pressed so as to create a succession of hollow half cylinders, of varying thickness and length for receiving pieces such as hot dog rolls, fancy "ficelles" (long very thin loaves).

BRIEF DESCRIPTION OF THE DRAWINGS

The invention will now be described in greater detail with reference to the accompanying drawings in which.

DETAILED DESCRIPTION OF THE PRESENTLY PREFERRED EXEMPLARY EMBODIMENTS

In the new general purpose equipment of the invention, a rigid tray 1 replaces therefore the specialized frame of the prior equipment mentioned above, this specialized frame being generally integral with the non stick baking surface. In the rest of the description and in the accompanying drawings, the tray is shown in the form of an independent element, but it is also possible for it to form an integral part of an assembly, such as a carriage or transfer chain.

The overall dimensions of tray 1 are defined by the standard dimensions of the equipment which, depending on the keys, will receive it or will act as such: opening of the oven doors, handling, storage or baking carriages, transfer chains in automated systems.

Figure 2A:
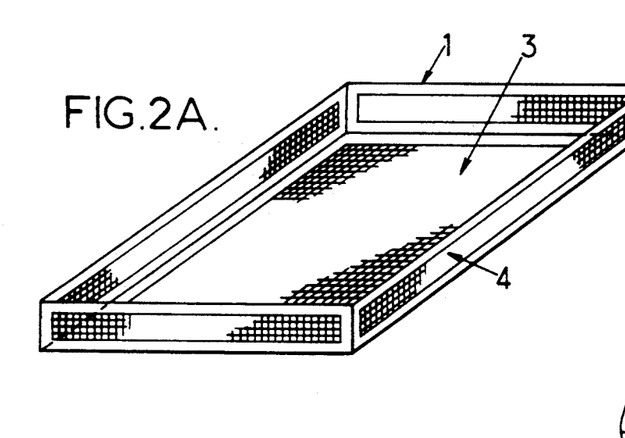
FIG. 2A is a perspective view of a tray in accordance with the present invention.
Figure 2B:
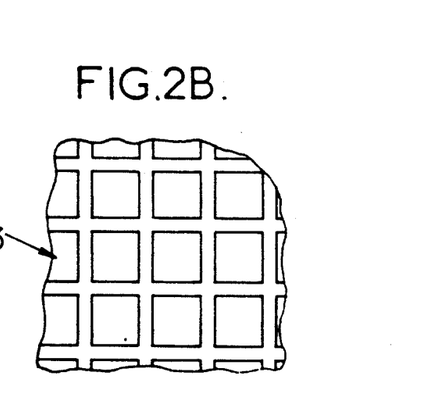
FIG. 2B is an enlarged view of a portion of the perforated flat bottom of the tray of FIG. 2A.

It has the shape of a rectangular or square container, with flat bottom 3, preferably perforated (as shown in FIG. 2b), the edges 4 also preferably perforated serving for fixing the preformed mold or membrane 2, and for conferring thereon a good rigidity. The tray is perforated so as to facilitate transmission and radiation of the heat for floor or tunnel ovens, and for creating hot air turbulences in the case of ventilated ovens so as to obtain uniform baking (cf. FIGS. 2a and 2b).

Baking tests with a stainless steel tray have shown that it was possible to choose perforations giving a maximum of void for the passage of the hot air, while conferring thereon as much rigidity as possible without making the tray heavy. By way of example, the best baking results for crusty loaves of the baguette type were obtained with an index of 70% void. Ribs or other strengthening means reinforcing the rigidity of the tray may also be judiciously formed in the tray. For other bread making products such as buns, soft rolls, small american sandwich loaves, the tray is not necessarily perforated.

A side flange 11 reinforces the general rigidity, and immobilizes the non stick membrane or mold during handling. Depending on the use this flange is specially designed to make the trays either superimposable and stackable or nestable.

Figure 3:
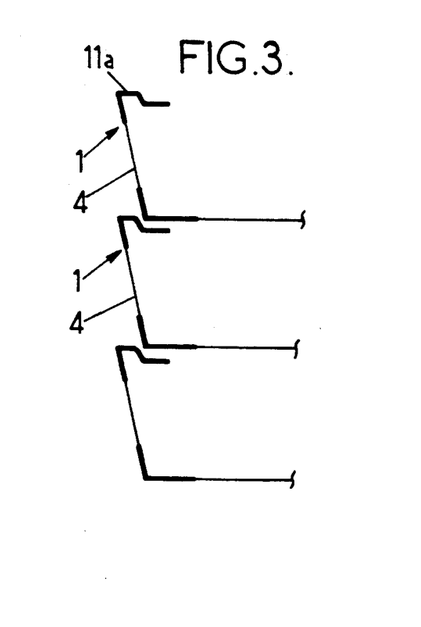
FIG. 3 is a schematic elevational view showing stacked trays in accordance with the invention.

In fact, in fermentation and baking chains where the handling operations are carried out automatically, the storage of trays either empty, or during fermentation raises problems of space. It may then be useful to provide, in this case, a special design (for example FIG. 3) of the upper flange 11A of the tray 1, for allowing stacking of the trays 1 one on the other without damage to the contents, and without edges which are too sharp which would hinder the automatic transfers.

Figure 4:
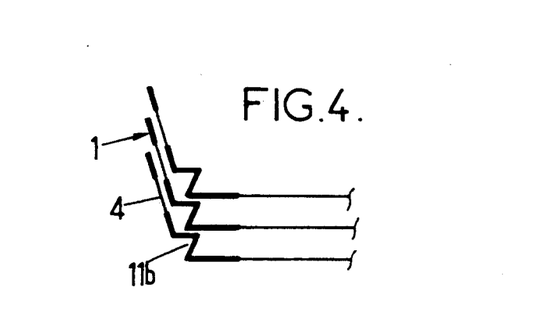
FIG. 4 is a schematic elevational view of nested trays in accordance with the invention.
Figures 5, 6A, 6B, 6C, 7A, 7B, 7C:
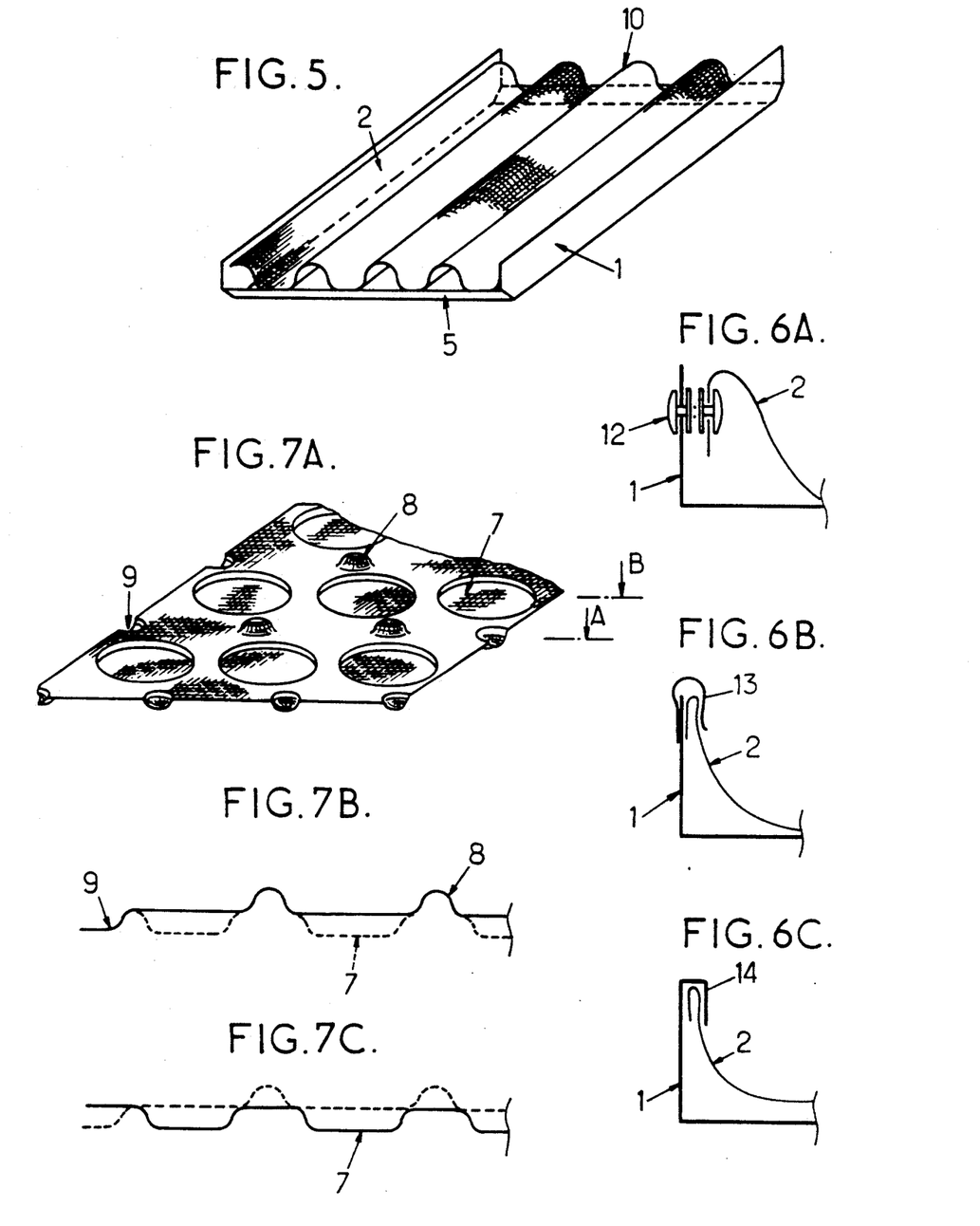
FIG. 5 is a perspective view showing an alternate tray configuration in accordance with the present invention.
FIG. 6A is a schematic elevational view of press studs in accordance with the present invention.
FIG. 6B is a schematic elevational view of clips in accordance with the present invention.
FIG. 6C is a schematic elevational view of grips provided in accordance with the present invention.
FIG. 7A is a perspective view of a non-stick membrane or mold in accordance with one embodiment of the invention.
FIG. 7B is a schematic sectional view taken along line A—A of FIG. 7A.
FIG. 7C is a schematic sectional view taken along line B—B of FIG. 7A.

So as to obtain maximum space saving, it may be preferably provided for trays 1 to be able to nest in each other (for example FIG. 4), which implies widening out of the side edges 4. A slight recess 11B is provided at the base or at the top of the outwardly tapering side edges, which receives the side of the next tray so that the trays can be readily separated and so that no embedment or jamming phenomenon occcurs. Furthermore, for facilitating removal of the loaves by simple sliding after baking two of the four lateral flanges may be lowered and slanted (FIG. 5). Thus, the baker may easily grip the tray and slide the loaves into a basket, the non stick membrane or mold remaining in the tray because a slight slanted flange has been kept (FIG. 5, reference 5). This slight flange 5 will also help in maintaining the rigidity of the whole of the tray.

For reasons of corrosion resistance and hygiene, the trays are made from an nonoxidizable metal (for example, stainless steel or aluminium).

As already mentioned, the best baking results, in a ventilated oven and in a conventional floor oven, were obtained with trays made from perforated metal sheets. In fact, the heat transfer takes place at a rate perfectly suitable for baking the lumps of dough which must not be "sealed" too quickly on the surface, so that they keep their maximum capacity of development in the first minutes after being placed in the oven, before final fixing of the crust.

For use in microwave ovens, the use of conducting or dielectric materials should be avoided. In this case insulating and non dielectric materials are therefore chosen, such as porcelain, glass, ceramic or certain synthetic materials.

For conventional ovens (fixed floor, ventilated—rotary or not—, tunnel), the new multipurpose system has the following advantages: it allows correct baking in all types of oven:

| | |
|---|---|
| ventilated oven: | the tray in contact with the non stick mold provides a certain "floor effect", namely baking of the bottom of the loaf by conduction. Furthermore, because of its perforations the trays creates turbulences of the stream of hot air promoting better baking of the lumps of dough; |
| fixed floor oven: | the tray protects the non stick molds from mechanical wear by friction during insertion in and removal from the oven. It avoids |

| | |
|---|---|
| tunnel system: | delicate handling of the fermented lumps of dough (so fragile) between the fermentation chamber, the conveyer feeding into the oven or the oven peel and the oven itself); the new system allows regular and straight baguettes and loaves to be obtained when they are baked in conveyer tunnel ovens. Automatic handling of the lumps of dough is accomplished without damage, for they are not handled individually. |

In some very particular cases, particularly when the baked products are removed from the mold by an automatic machine, operating either by suction or by sweeping or combing, the self supporting (that is to say keeping its shape when it rests on its support with side flanges) non stick membrane or mold may then, if necessary, be fixed to its side flange support by means of a set of removable fixing means, such as press studs 12 (FIG. 6A), clips 13 (FIG. 6B) or grips 14 (FIG. 6C).

Figure 10:
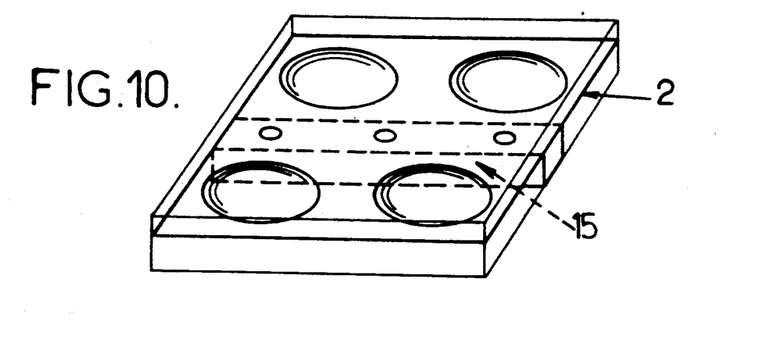
FIG. 10 is perspective view of a non-stick membrane or a mold weighted by a weight riveted to the membrane between its impressions.

The non stick membrane or mold may also be weighted by a weight or bar 15 judiciously riveted to membrane 2 between its impressions (FIG. 10).

The purpose of these solutions is to hold the non stick membrane or mold in the tray, while maintaining its completely removable character.

From a fundamental point of view, the mechanical supporting function and the non stick membrane or mold function are entirely independent.

For as many different uses as he desires, the bakerpastry maker only requires a minimum number of trays 1 depending on his baking program.

On the other hand, he will have in reserve specialized non stick membranes or molds 2 depending on the products he desires to produce. These non stick membranes or molds take up little space, are light, washable, economic and fitting together in nests of families. Replacement thereof raises no problem.

These advantages consequently result in doing away with reprocessing of the compartmented metal nets and of the metal baking trays (with impressions or flat), for in the new multipurpose system, it is easy and economic to replace the worn non stick membrane or mold by a new one. These preformed and interchangeable non stick membranes or molds self supporting on a side flanged support, but independent of this support, are new products.

Figure 1:
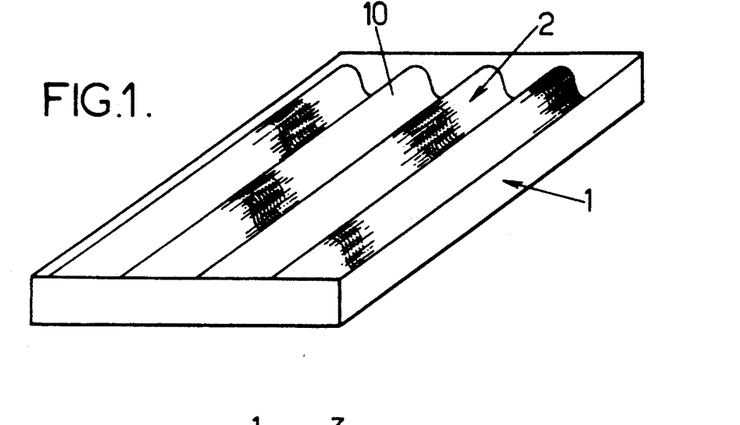
FIG. 1 is a general perspective view of the equipment adapted in accordance with the invention.
Figure 8:
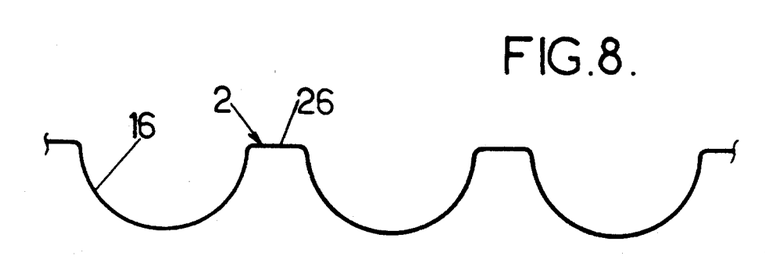
FIG. 8 is a schematic sectional view of a further alternate non-stick membrane or mold in accordance with the invention.
Figure 9:
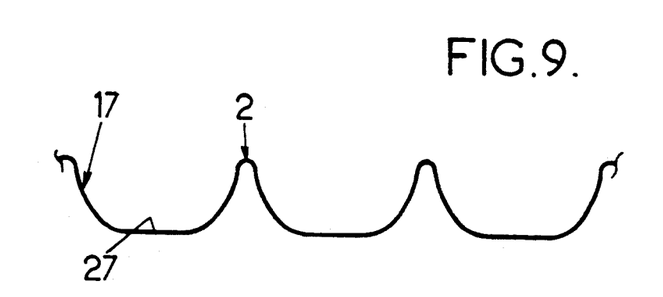
FIG. 9 is a schematic sectional view of yet another non-stick membrane or mold in accordance with the invention.
Figure 11A:
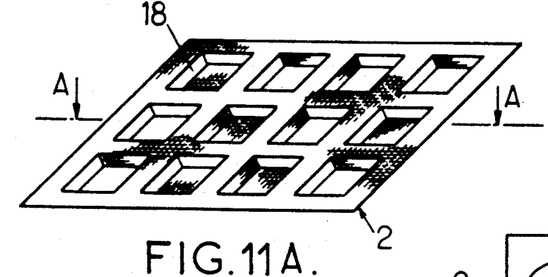
FIG. 11A is a perspective view of yet another non-stick membrane or a mold provided in accordance with the present invention.
Figure 11B:
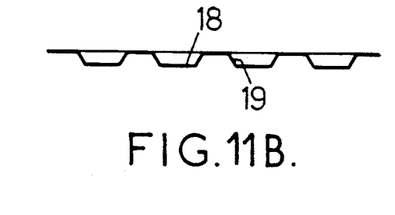
FIG. 11B is a schematic sectional view taken along line A—A of FIG. 11A.
Figure 12:
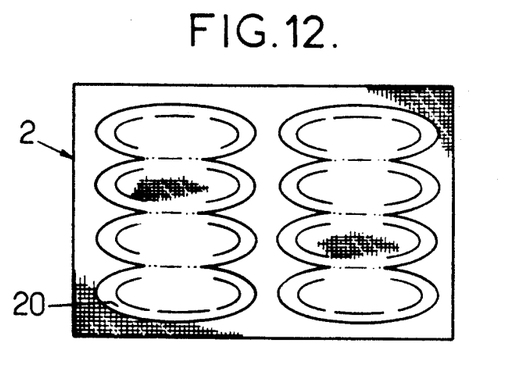
FIG. 12 is a plan view of another non-stick membrane or a mold in accordance with the present invention.
Figure 13:
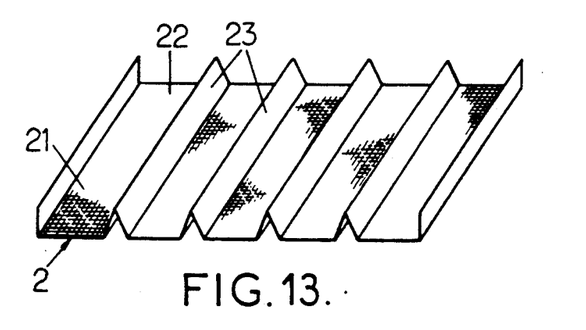
FIG. 13 is a perspective view of yet a further alternate non-stick membrane or mold in accordance with the present invention.

In preferred embodiments of the invention, the non stick membranes or molds have the characteristics described hereafter:

the non stick membrane or mold of the invention is removable; the same independent tray or the same independent side flanged support playing the role of said tray accepts such non stick membranes or molds having multiple shapes, more particularly:

waves 10 in the form of substantially cylindrical channels, of a greater or lesser width, whose width corresponds to that of a baguette or a loaf and whose height corresponds at most to half the height of a baguette or loaf (FIG. 1 or FIG. 5);

waves 16 in the form of substantially cylindrical channels, of greater or lesser width, between which are provided gaps materialized by a flat surface 26 at the top of the channels, ensuring a better heat circulation (FIG. 8);

waves 17 in the form of substantially cylindrical channels of greater or lesser width, the bottom 27 of these channels being slightly flattened over a width of 2 to 4 cm so that the baked loaf such as a sandwich loaf may rest flat and not collapse on one side or the other once out of the channel (FIG. 9).

recess 18 of square or rectangular shape (FIG. 11A), with a taper 19 (FIG. 11B which is a section through line A—A) for removing the baked pieces and a separation by narrow channels, so as to accommodate all square or rectangular section pieces, such as choclate buns, almond slices.

oval cradles 20 of oblong shape with a taper (FIG. 12) for removing the pieces, the cradles succeeding each other contiguously by the large side, for receiving shuttle shaped pieces, such as milk rolls, butter croissants;

successive rows of round and hollow dishes 7, with flat bottom and variable diameter, depth and taper (FIG. 7A, FIG. 7B which is a section through line A—A of FIG. 7A and FIG. 7C which is a section through line B—B of FIG. 7A) depending on the nature of the pieces to be baked, such as small round bread rolls, bread rolls for hamburgers, buns, muffins, fruit breads;

hollow semicylinders of variable thickness and length for receiving pieces such as bread buns for hot dogs, fancy "ficelles" (long and very thin loaf);

rectangular channels 21 with flat bottom 22 separated by an inverted V shaped bend 23, for receiving Viennese bread products such as croissant, or other products jointingly connected by one or more points of their perimeter (FIG. 13).

The preformed non stick membranes or molds, not fixed to the tray, serve for receiving the lump of dough after shaping. It remains there during the whole fermentation and baking phases, which avoids any delicate handling, particularly between the end of fermentation and introduction in the oven, when the structure of the fermented dough is of a very great fragility.

The non stick molds or membranes may be advantageously made from glass fabric and/or from new fibers such as carbon fibers, ceramic or similar material threads or fibers. For example, experiments have shown that carbon fiber provides an excellent diffusion of the heat through the whole of the non stick membrane or mold, which is an advantage when, for example, a large sized piece is to be baked requiring very uniform baking at all its points, such as Genoese pastry strips or sponge cakes.

As for the ceramic fiber it also has the advantage of good heat transfer. It further provides a very good connection with silicone. It is ideal for baking in ovens using high frequency current (microwave ovens).

The non stick property of the molds and membranes is obtained by impregnation and/or coating of the strands with one or more elastomers or silicone resins, which are then vulcanized or cured. The non stick membrane or mold may, depending on the needs, be made from woven cloth, knitted fabrics or non woven textiles. For example, the woven cloth is chosen preferably for developable shapes (parallel waves, dividing walls), whereas the knitted fabric is preferred for undevelopable shapes requiring deformation in both directions of the membrane, by a pressing process, as well be described further on.

As for the unwoven textile, it is to be preferred when the membrane or mold requires minimum or even no ventilation at all, in the case of use for baking liquid or very soft pastes, such as madeleines or cakes.

The perforation of the fabrics varies as a function of the nature of the doughs or pastes: the membranes include at least 25% void and preferably 50% void and better still 75% void; from more than 50% void for normal doughs, it will become less than 50% void for deep frozen doughs and yellow doughs which present problems of consistency promoting mechanical anchorage in the mesh or holes of the fabric. Some doughs or batter such as cake dough require a very close mesh fabric which is occluded by complete impregnation or complete coating with silicone.

The non stick materials are impregnated in, then applied on the above mentioned fabrics. The preformation is obtained by the stiffening due to the vulcanization of the elastomers or to the baking of the resins.

When it is a question of molds developable in two dimensions, molding without deformation is carried out just before the vulcanization or the baking.

When non developable three dimensional impressions are to be formed with respect to a crooked surface (small round bread buns, buns, croissants, chocolate buns, hot dogs), the impregnated fabric is pressed on adequate molds before vulcanization or baking. How, the fabric cannot be pressed without damaging the weft of the fabric. There then exists two possible methods.

the first one consists in working the fabric slant wise which allows it to be deformed without damage, it has the drawback of using much more material than necessary, and so of leaving appreciable waste pieces;

the second one is based on the following principle: each weft or warp thread must have strictly the same length from one end to the other of the finished piece. Thus, when some threads extend into the hollows of the impressions for small bread buns, those which form the gaps between the impressions must follow a path of the same length as the others. In their path, a succession of recesses and bosses is formed (FIG. 7A, section A), so that their total length is strictly the same as that of the neighbours which form the impressions (FIG. 7A, section B). On the periphery of the piece to be produced, the recesses provide better seating for the assembly by placing part of the sides of the piece at the level of the bottom of the impressions (FIGS. 7A and 7B, reference 9). In the center of the piece, between the impressions, are disposed bosses which better separate the lumps of dough from each other when they swell during fermentation and tend to attract each other when they swell out of the impressions (FIGS. 7A and 7B, reference 8). With this method, the fabric may be cut straight, along the weft or along the warp, and the considerable losses due to slantwise cutting can be avoided.

Figure 14:
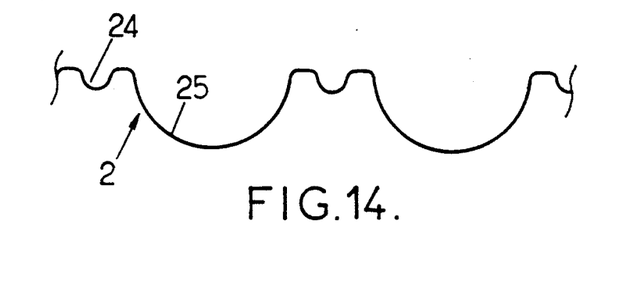
FIG. 14 is a schematic sectional view of yet a further alternate non-stick membrane or mold in accordance with the invention.

To provide the self supporting character of the preformed membranes in the independent support, preferably in the form of side flanged trays, intended for receiving them, so as to provide correct stiffening and strength for the non stick membrane or mold, it is useful to apply, at certain chosen positions, denser layers of elastomers or silicone resins, so as to create, after vulcanization or baking, zones 24 of sufficient hardness. For example, between the waves of channels 25, so as to obtain an accordion effect, and so as to avoid a possible flabbiness (FIG. 14); or else, for example, under the bottom of the waves of the baguettes so as to avoid abrasion by friction; finally, on any point of the non stick membrane or mold which may be subjected, either because of handling or because of baking, to more rapid wear than the rest of the non stick membranes or mold. Preferably, the preformed non stick membranes will systematically receive over the whole of the periphery or perimeter a denser layer of elastomers or silicones resins.

From the foregoing and the accompanying illustrations, it is apparent that the self-supporting element of the invention is particularly characterized in that it retains its preformed shape and is self supporting in the absence of any foreign, shaped-defining, rigid components coupled thereto or mounted to the tray on which the self-supporting element is received.

The new general purpose system which has just been described, characterized more especially by the possibility of using a set of new flexible molds or membranes which are interchangeable because of their perfectly removable character with respect to the support in the form of a tray with side flanges intended to receive them, and which are preformed to dimensions and shapes of all the varieties of bread making products, offers then a very great flexibility in use for the baker (all breads, all ovens) and great economy (reduced cost, reduced storage). Of course, the field of use of the invention is not limited to bread making and may extend to other fields such as pastry making and the delicatessen trade (catering products: quiches, tarts, meat pies etc.).

We claim:

1. A versatile equipment for supporting bakery or pastry products during the steps of at least one of fermentation and baking, consisting essentially of:

a substantially rectangular tray having a substantially flat bottom having a substantially rectangular shape and upstanding flanges defined about the periphery of said flat bottom; said tray being made of a metal selected from the group consisting of stainless steel and aluminum; and at least one of the bottom and said flanges being perforated; and at least one self-supporting element each for being removably disposed on said bottom and transversely retained within the confines of said upstanding flanges, said self-supporting element consists essentially of fibers selected from the group consisting of glass fibers, carbon fibers, ceramic fibers and combinations thereof, and which have been coated with a material having non-stick properties, said self-supporting element being preshaped so as to include recesses of any desired shapes and sizes so as to correspond to shapes and sizes of bakery or pastry products to be baked while disposed on said self-supporting element; whereby said self-supporting element has non-stick properties; retains its shape and is self-supporting in the absence of any foreign, shape-defining, rigid components coupled thereto or mounted to said tray; and is protected so as to avoid rapid wear.

2. A self-supporting element for supporting bakery or pastry products during the steps of at least one of fermentation and baking, wherein said element is a self-supporting element which has non-stick properties, which includes a plurality of preformed recesses having any desired lengths, widths and shapes corresponding to lengths, widths and shapes of bakery or pastry products to be disposed therein, and which is adapted so as to rest removably on a supporting means having a flat bottom and upstanding flanges at the periphery of said flat bottom so as to limit movements of said self-supporting element in the plane of said flat bottom, and wherein said self-supporting element consists essentially of a fabric selected from the group consisting of woven, knitted and non-woven fibers selected from the group consisting of glass fibers, carbon fibers, ceramic fibers and combinations thereof, said fabric having been treated by at least one of an impregnation step and a coating step with elastomers or silicone resins, then preformed to have said recesses and stiffened respectively by vulcanization of the elastomers or by curing of the silicone resins, thereby providing said non-stick properties and said self-supporting characteristic whereby said self-supporting element retains its shape and is self-supporting in the absence of any foreign, shape-defining, rigid components coupled thereto or mounted to the supporting means; and means for stiffening and protecting said self-supporting element to avoid flabbiness and rapid wear thereof.

3. A self supporting element as in claim 2, wherein said self-supporting element is non-perforated so as to be adapted to receive fluid doughs thereon.

4. A self supporting element as in claim 2, wherein said self-supporting element is perforated with at least 25% void space and less than 50% void space so as to be adapted to receive at least one of deep frozen doughs and yellow doughs.

5. A self supporting element as in claim 2, wherein said self supporting element is perforated with more than 50% void space.

6. A self-supporting element as in claim 2, wherein said fabric is preformed by molding.

7. A self supporting element as in claim 6, wherein said self-supporting element includes stiffened and protected portions which are thicker than other areas of the element.

8. A self-supporting element as in claim 2, wherein said fabric is preformed by pressing, then stiffened once pressed.

9. A self supporting element as in claim 8, wherein said self-supporting element includes stiffened and protected portions which are thicker than other areas of the element.

10. A self supporting element as in claim 8, wherein recessed impressions are preformed in said self-supporting element and wherein the pressing is carried out so that all fibers of the impregnated or coated fabric have the same length by compensating for the preformed recessed impressions with bosses defined in portions of the self-supporting element disposed between the preformed recessed impressions.

11. A self supporting element as in claim 8, wherein recessed impressions are preformed in the self-supporting element and wherein the pressing is carried out so that all the fibers of the impregnated or coated fabric have the same length by compensating for the preformed recessed impressions with bosses defined in portions of the self-supporting element disposed between the preformed recessed impressions, external lateral rows of bosses being downwardly inverted.

12. A self supporting element as in claim 2, wherein said element has a wavy profile formed of substantially semicylindrical channels with substantially flattened bottoms.

13. A self supporting element as in claim 2, wherein said element has a wavy profile formed of substantially semicylindrical channels with substantially flattened bottoms, said channels being separated by gaps defined by flat surfaces situated at the tops of the channels so as to provide a better circulation of heat.

14. A self-supporting element as in claim 2, wherein said element is molded so as to form a set of one of rectangular and square channels with flat bottoms, separated by an inverted V shaped bend, for receiving pieces of rolls jointingly connected by at least one point at their periphery.

15. A self supporting element as in claim 8, wherein recessed impressions are preformed in said self-supporting element and wherein the pressing is carried out so that all fibers of the impregnated or coated fabric have the same length by compensating for the preformed recessed impressions with bosses defined in portions of said self-supporting element disposed between the recessed impressions to create longttudinal and transverse successions of recessed impressions, of one of rectangular and square shape.

16. A self-supporting element as in claim 8, wherein recessed impressions are preformed in said self-supporting element and wherein the pressing is carried out so that all fibers of the impregnated or coated fabric have the same length by compensating for the preformed recessed impressions with bosses defined in portions of the self-supporting element disposed between the recessed impressions so as to create oval cradles of oblong shape, said oval cradles being adapted to receive oblong products.

17. A self supporting element as in claim 8, wherein recessed impressions are preformed in said self-supporting element and wherein the pressing is carried out so that all fibers of the impregnated or coated fabric have the same length by compensating for the preformed recessed impressions with bosses defined in portions of the self-supporting element disposed between the recesses so as to create successive lines of round and hollow dishes, with flat bottoms of variable diameter, depth and side wall taper corresponding to the nature of the pieces to be baked.

18. A self-supporting element for supporting bakery or pastry products during the steps of at least one of fermentation and baking, wherein said element is a self-supporting element which has non-stick properties, which includes a plurality of preformed recesses having lengths, widths and shapes corresponding to lengths, widths and shapes of bakery or pastry products to be disposed therein, and which is adapted so as to rest removably on a supporting means which limits movement thereof in a plane of said supporting means, wherein said self-supporting element is a fabric selected from the group consisting of woven, knitted and non-woven fibers selected from the group consisting of glass fibers, carbon fibers, ceramic fibers and combinations thereof, said fabric having strands treated by at least one of impregnation and coating with elastomers or silicone resins, then preformed by molding or by pressing and stiffened respectively by vulcanization of the elastomers or by curing of the silicone resins, thereby providing said non-stick properties and said self-supporting characteristic, wherein said self-supporting element includes stiffened and protected portions which are thicker than other areas of the element, at the periphery of said self-supporting element, so as to stiffen and protect the periphery of said self-supporting element.

19. A self-supporting element for supporting bakery or pastry products during the steps of at least one of fermentation and baking, wherein said element is a self-supporting element which has non-stick properties, which includes a plurality of preformed recesses having any desired lengths, widths and shapes corresponding to length, widths and shaped of bakery or pastry products to be deposed therein, and which is adapted so as to rest removably on a supporting tray having a flat bottom and upstanding flanges at the periphery of said flat bottom so as to limit movements of said self-supporting element in the plane of said flat bottom, wherein said self-supporting element consists essentially of a fabric selected from the group consisting of woven, knitted, and non-woven fibers selected from the group consisting of glass fibers, carbon fibers, ceramic fibers and combinations thereof, said fabric having strands treated by at least one of impregnation and coating with elastomers or silicone resins, then preformed by pressing and is stiffened, once pressed, respectively by vulcanization of the elastomers or by curing of the silicone resins, thereby providing said non-stick properties and said self-supporting characteristic whereby said self-supporting element retains its shape and is self-supporting in the absence of any foreign, shape-defining, rigid components coupled thereto or mounted to the supporting tray, said self-supporting element being entirely occluded so as to be adapted to receive liquid doughs.

20. A versatile equipment for supporting bakery or pastry products during the steps of at least one of fermentation and baking, which comprises:

a substantially rectangular tray having a substantially flat bottom and upstanding flanges extending along a periphery of said flat bottom, and at least one self-supporting element which has non-stick properties, which includes a plurality of preformed recesses having any desired lengths, widths and shapes corresponding to lengths, widths and shapes of bakery or pastry products to be disposed therein, and which is adapted so as to rest removably on said substantially flat bottom of said tray so as to be transversely retained by said upstanding flanges, and wherein said self-supporting element consists essentially of a fabric of woven, non-woven or knitted fibers selected from the group consisting of glass fibers, carbon fibers, ceramic fibers and combinations thereof, said fabric having been treated by at least one of impregnation and coating with elastomers or silicone resins, then preformed and stiffened respectively by vulcanization of the elastomers or by curing of the silicone resins so as to provide said non-stick properties; said self-supporting characteristic whereby said self-supporting element retains its shape and is self-supporting in the absence of any foreign, shape-defining, rigid components coupled thereto or mounted to the tray; and so that any portion of said self-supporting element subjected to wear is protected so as to avoid rapid wear.

21. Versatile equipment as in claim 20, wherein said tray is a component of one of a carriage and a transfer chain.

22. A self-supporting element as in claim 6, wherein said self-supporting element includes stiffened and protected portions which include at least silicone zones which are denser than other areas of the element.

23. A self-supporting element as in claim 8, wherein said self-supporting element includes stiffened and protected portions which include at least silicone zones which are thicker than other areas of the element.

24. A self supporting element as in claim 8, wherein recessed impressions are preformed in said self-supporting element so as to create longitudinal and transverse successions of recessed impressions, of one of rectangular and square shape.

25. A self-supporting element as in claim 8, wherein recessed impressions are preformed in said self-supporting element so as to create oval cradles of oblong shape, said oval cradles being adapted to receive oblong products.

26. A self-supporting element as in claim 8, wherein recessed impressions are preformed in said self-supporting element so as to create successive lines of round and hollow dishes, with flat bottoms of variable diameter, depth and side wall taper corresponding to the nature of the pieces to be baked.

27. A self supporting element as in claim 18, wherein said self-supporting element is non-perforated so as to be adapted to receive fluid doughs thereon.

28. A self supporting element as in claim 18, wherein said self-supporting element is perforated with at least 25% void space and less than 50% void space so as to be adapted to receive at least one of deep frozen doughs and yellow doughs.

29. A self supporting element as in claim 18, wherein said self-supporting element is perforated with more than 50% void space.

30. A self supporting element as in claim 18, wherein said element has a wavy profile formed of substantially semicylindrical channels with substantially flattened bottoms.

31. A self supporting element as in claim 18, wherein said element has a wavy profile formed of substantially semicylindrical channels with substantially flattened bottoms, said channels being separated by gaps defined by flat surfaces situated at the tops of the channels so as to provide a better circulation of heat.

32. A self supporting element as in claim 18, said element is molded so as to form a set of one of rectangular and square channels with flat bottoms, separated by an inverted V shaped bend, for receiving pieces of rolls jointingly connected by at least one point at their periphery.

33. Versatile equipment according to claim 20, wherein at least one of the bottom of the tray and said upstanding flanges is perforated.

34. Versatile equipment according to claim 20, wherein said upstanding flanges are sized and configured so that a plurality of trays can be nested into one another.

35. Versatile equipment according to claim 20, wherein said tray is made of a metal selected from the group consisting of stainless steel and aluminum.

36. Versatile equipment according to claim 20, wherein said tray is formed from a nondielectric material so as to be microwavable.

37. Versatile equipment according to claim 20, further comprising fixing means for removably fixing said element to said tray.

* * * * *